United States Patent
Eberle, Jr.

(10) Patent No.: US 10,067,295 B2
(45) Date of Patent: Sep. 4, 2018

(54) BEND-LIMITED FLEXIBLE OPTICAL INTERCONNECT DEVICE FOR SIGNAL DISTRIBUTION

(71) Applicant: CommScope Techologies LLC, Hickory, NC (US)

(72) Inventor: James Joseph Eberle, Jr., Hummelstown, PA (US)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 14/987,021

(22) Filed: Jan. 4, 2016

(65) Prior Publication Data
US 2016/0223751 A1    Aug. 4, 2016

Related U.S. Application Data (63) Continuation of application No. 13/230,117, filed on Sep. 12, 2011, now Pat. No. 9,229,172.

(51) Int. Cl.
  *G02B 6/36* (2006.01)
  *G02B 6/32* (2006.01)
(52) U.S. Cl.
  CPC ............ *G02B 6/3608* (2013.01); *G02B 6/32* (2013.01)
(58) Field of Classification Search
  CPC ................................ G02B 6/3608; G02B 6/32
  See application file for complete search history.

(56) References Cited

U.S. PATENT DOCUMENTS

| | | | |
|---|---|---|---|
| 3,330,105 A | * | 7/1967 | Weber .................. B23Q 1/0009 138/120 |
| 4,697,874 A | | 10/1987 | Nozick |
| 5,430,823 A | | 7/1995 | Dupont et al. |
| 5,438,641 A | | 8/1995 | Malacarne |
| 5,461,690 A | | 10/1995 | Lampert |

(Continued)

FOREIGN PATENT DOCUMENTS

| CN | 1248329 A | 1/1998 |
|---|---|---|
| EP | 0563995 | 10/1999 |

(Continued)

OTHER PUBLICATIONS

International Search Report and Written Opinion for PCT/US2012/054263 dated Feb. 27, 2013.

(Continued)

*Primary Examiner* — Peter Radkowski
(74) *Attorney, Agent, or Firm* — Merchant & Gould P.C.

(57) ABSTRACT

The invention relates to a bend limiting structure for preventing a flexible optical circuit from being bent too sharply. More particularly, the invention involves adding a bend limiting layer or layers to the flexible optical circuit and/or any housing or other structure within which it is enclosed or to which it is attached. The bend-limiting layer may comprise a plurality of blocks arranged in a line or plane and joined by a flexible film that is thinner than the blocks, with the blocks positioned close enough to each other so that, if that plane of blocks is bent a predetermined amount, the edges of the blocks will interfere with each other and prevent the plane from being bent any further. The blocks may be resilient also to provide a less abrupt bend-limiting stop.

16 Claims, 8 Drawing Sheets

(56) References Cited

U.S. PATENT DOCUMENTS

| | | | |
|---|---|---|---|
| 5,475,215 A * | 12/1995 | Hsu | G02B 6/4204 250/227.11 |
| 5,488,682 A * | 1/1996 | Sauter | G02B 6/43 385/24 |
| 5,509,096 A | 4/1996 | Easley | |
| 5,521,992 A * | 5/1996 | Chun | G02B 6/1221 257/666 |
| 5,530,783 A | 6/1996 | Belopolsky et al. | |
| 5,613,030 A | 3/1997 | Hoffer et al. | |
| 5,655,044 A | 8/1997 | Finzel et al. | |
| 5,742,480 A | 4/1998 | Sawada et al. | |
| 5,764,839 A * | 6/1998 | Igl | H01R 13/562 385/100 |
| 5,889,910 A * | 3/1999 | Igl | H01R 13/56 385/100 |
| 5,917,976 A * | 6/1999 | Yamaguchi | G02B 6/4249 385/88 |
| 5,917,980 A * | 6/1999 | Yoshimura | G02B 6/138 385/122 |
| 5,971,626 A | 10/1999 | Knodell et al. | |
| 5,975,769 A * | 11/1999 | Larson | G02B 6/4453 385/134 |
| 6,012,852 A | 1/2000 | Kadar-Kallen et al. | |
| 6,022,150 A | 2/2000 | Erdman et al. | |
| 6,027,252 A | 2/2000 | Erdman et al. | |
| 6,208,779 B1 | 3/2001 | Rowlette, Sr. et al. | |
| 6,215,938 B1 | 4/2001 | Reitmeier et al. | |
| 6,269,214 B1 | 7/2001 | Naudin et al. | |
| 6,338,975 B1 * | 1/2002 | Yoshimura | G02B 6/138 438/29 |
| 6,442,323 B1 * | 8/2002 | Sorosiak | G02B 6/3608 385/137 |
| 6,480,661 B2 | 11/2002 | Kadar-Kallen et al. | |
| 6,496,638 B1 | 12/2002 | Andersen | |
| 6,510,273 B2 | 1/2003 | Ali et al. | |
| 6,547,445 B2 * | 4/2003 | Kiani | G02B 6/3612 385/53 |
| 6,573,451 B2 * | 6/2003 | Komiya | H02G 11/006 174/68.1 |
| 6,594,434 B1 | 7/2003 | Davidson et al. | |
| 6,600,866 B2 | 7/2003 | Gatica et al. | |
| 6,648,376 B2 | 11/2003 | Christianson | |
| 6,690,862 B1 * | 2/2004 | Rietveld | G02B 6/43 385/24 |
| 6,690,867 B2 * | 2/2004 | Melton | G02B 6/3608 385/114 |
| 6,697,560 B1 * | 2/2004 | Kondo | G02B 6/3608 385/137 |
| 6,763,166 B2 * | 7/2004 | Yow, Jr. | G02B 6/4472 385/114 |
| 6,764,221 B1 | 7/2004 | de Jong et al. | |
| 6,768,860 B2 | 7/2004 | Liberty | |
| 6,775,458 B2 | 8/2004 | Yow, Jr. et al. | |
| 6,793,399 B1 * | 9/2004 | Nguyen | G01M 11/088 356/241.1 |
| 6,810,193 B1 | 10/2004 | Müller | |
| 6,845,208 B2 | 1/2005 | Thibault et al. | |
| 6,925,241 B2 | 8/2005 | Bohle et al. | |
| 6,934,457 B2 | 8/2005 | Vincent et al. | |
| H002144 H * | 2/2006 | Baechtle | 385/14 |
| H2144 H | 2/2006 | Baechtle et al. | |
| 7,006,748 B2 | 2/2006 | Dagley et al. | |
| 7,068,907 B2 | 6/2006 | Schray | |
| 7,092,592 B2 * | 8/2006 | Verhagen | G02B 6/3608 385/14 |
| 7,139,456 B2 * | 11/2006 | Sasaki | G02B 6/4472 385/114 |
| 7,248,772 B2 * | 7/2007 | Suzuki | G02B 6/10 385/129 |
| 7,302,153 B2 | 11/2007 | Thom | |
| 7,352,921 B2 * | 4/2008 | Saito | G02B 6/3608 385/114 |
| 7,406,240 B2 | 7/2008 | Murano | |
| 7,433,915 B2 | 10/2008 | Edwards et al. | |
| 7,460,757 B2 | 12/2008 | Hoehne et al. | |
| 7,496,268 B2 | 2/2009 | Escoto et al. | |
| 7,543,993 B2 * | 6/2009 | Blauvelt | G02B 6/4201 385/14 |
| 7,553,091 B2 | 6/2009 | McColloch | |
| 7,689,089 B2 | 3/2010 | Wagner et al. | |
| 7,706,656 B2 | 4/2010 | Zimmel | |
| 7,722,261 B2 * | 5/2010 | Kadar-Kallen | G02B 6/32 385/72 |
| 7,738,755 B2 * | 6/2010 | Shioda | G02B 6/1221 385/129 |
| 7,738,760 B2 | 6/2010 | Fredrickson et al. | |
| 7,747,125 B1 | 6/2010 | Lee et al. | |
| 7,751,674 B2 | 7/2010 | Hill | |
| 7,775,725 B2 | 8/2010 | Grinderslev | |
| 7,856,166 B2 | 12/2010 | Biribuze et al. | |
| 7,889,961 B2 | 2/2011 | Cote et al. | |
| 7,942,004 B2 | 5/2011 | Hodder | |
| 7,945,138 B2 * | 5/2011 | Hill | G02B 6/4454 385/135 |
| 8,059,932 B2 | 11/2011 | Hill et al. | |
| 8,085,472 B2 | 12/2011 | Kadar-Kallen | |
| 8,374,477 B2 * | 2/2013 | Hill | G02B 6/4454 385/135 |
| 8,485,737 B2 * | 7/2013 | Kolesar | G02B 6/4472 385/24 |
| 2002/0090191 A1 * | 7/2002 | Sorosiak | G02B 6/3608 385/137 |
| 2003/0031452 A1 * | 2/2003 | Simmons | G02B 6/3668 385/147 |
| 2003/0042040 A1 * | 3/2003 | Komiya | H02G 11/006 174/72 A |
| 2003/0044141 A1 * | 3/2003 | Melton | G02B 6/3608 385/114 |
| 2003/0128951 A1 | 7/2003 | Lecomte et al. | |
| 2003/0174953 A1 * | 9/2003 | Carnevale | G02B 6/4472 385/39 |
| 2003/0182015 A1 | 9/2003 | Domaille et al. | |
| 2004/0175090 A1 | 9/2004 | Vastmans et al. | |
| 2004/0179771 A1 * | 9/2004 | Verhagen | G02B 6/3608 385/17 |
| 2004/0213505 A1 * | 10/2004 | Saito | G02B 6/3608 385/14 |
| 2005/0084200 A1 * | 4/2005 | Meis | G02B 6/3608 385/14 |
| 2005/0111801 A1 * | 5/2005 | Garman | G02B 6/4472 385/114 |
| 2005/0123261 A1 * | 6/2005 | Bellekens | G02B 6/4455 385/135 |
| 2006/0088258 A1 * | 4/2006 | Sasaki | G02B 6/4472 385/114 |
| 2006/0098914 A1 * | 5/2006 | Tourne | G02B 6/3825 385/14 |
| 2007/0003204 A1 | 1/2007 | Makrides-Saravanos et al. | |
| 2007/0025672 A1 * | 2/2007 | Suzuki | G02B 6/10 385/129 |
| 2007/0206902 A1 * | 9/2007 | Blauvelt | G02B 6/4201 385/49 |
| 2007/0230863 A1 | 10/2007 | Fukuda et al. | |
| 2007/0237449 A1 * | 10/2007 | Aoki | G02B 6/4292 385/14 |
| 2008/0145011 A1 | 6/2008 | Register | |
| 2008/0175550 A1 | 7/2008 | Coburn et al. | |
| 2008/0273846 A1 | 11/2008 | Register | |
| 2009/0067802 A1 | 3/2009 | Hoehne et al. | |
| 2009/0097800 A1 | 4/2009 | Gurreri et al. | |
| 2009/0142026 A1 * | 6/2009 | Shioda | G02B 6/1221 385/131 |
| 2010/0142910 A1 | 6/2010 | Hill et al. | |
| 2010/0158465 A1 | 6/2010 | Smrha | |
| 2011/0085771 A1 * | 4/2011 | Matsuyama | G02B 6/43 385/125 |
| 2011/0096404 A1 | 4/2011 | Kadar-Kallen | |
| 2011/0103803 A1 * | 5/2011 | Kolesar | G02B 6/28 398/142 |
| 2011/0217016 A1 | 9/2011 | Mullsteff | |

(56) References Cited

U.S. PATENT DOCUMENTS

| | | | |
|---|---|---|---|
| 2011/0222823 A1* | 9/2011 | Pitwon | G02B 6/42 385/93 |
| 2011/0262077 A1 | 10/2011 | Anderson et al. | |
| 2011/0268404 A1 | 11/2011 | Cote et al. | |
| 2011/0268408 A1 | 11/2011 | Giraud et al. | |
| 2011/0268410 A1 | 11/2011 | Giraud et al. | |
| 2011/0268412 A1 | 11/2011 | Giraud et al. | |
| 2012/0002934 A1* | 1/2012 | Kimbrell | G02B 6/4439 385/135 |
| 2012/0008900 A1 | 1/2012 | Schneider | |
| 2012/0014645 A1 | 1/2012 | Kadar-Kallen | |
| 2012/0020618 A1 | 1/2012 | Erdman et al. | |
| 2012/0020619 A1 | 1/2012 | Kadar-Kallen et al. | |
| 2012/0051706 A1 | 3/2012 | Van Geffen et al. | |
| 2012/0057838 A1 | 3/2012 | Hill et al. | |
| 2012/0213469 A1* | 8/2012 | Jia | H04B 10/801 385/14 |
| 2012/0263415 A1 | 10/2012 | Tan et al. | |
| 2013/0077913 A1 | 3/2013 | Schneider et al. | |
| 2013/0148926 A1* | 6/2013 | Koshinz | G02B 6/2808 385/46 |
| 2013/0148936 A1 | 6/2013 | Hill | |
| 2013/0343700 A1* | 12/2013 | Kolesar | G02B 6/28 385/24 |

FOREIGN PATENT DOCUMENTS

| | | | | |
|---|---|---|---|---|
| WO | WO 9417534 A1 * | 8/1994 | | G02B 6/443 |
| WO | 9836309 A1 | 8/1998 | | |
| WO | WO 03/021312 A1 | 3/2003 | | |
| WO | WO 2008/027201 | 3/2008 | | |

OTHER PUBLICATIONS

International Standard, "Fiber optic connector interfaces—Part 4-1: Type SC connector family—Simplified receptacle SC-PC connecter interfaces." Copyright IEC 61754-4-1, First edition, Jan. 2003 (9 pages).

U.S. Appl. No. 61/538,737, filed Sep. 23, 2011, and entitled "Flexible Optical Circuit" (13 pages).

Schneider et al., "Fibre Optic Circuits," TechCon 2011 (10 pages).

European Search Report for Application No. 12831579.3 dated Mar. 27, 2015.

U.S. Appl. No. 13/326,852, filed Dec. 15, 2011, Inventor Kadar-Kallen, "Ferrule with Encapsulated Protruding Fibers".

Bockstaele, et al., "A scalable parallel optical interconnect family," IO Overview Paper, Apr. 2002.

Grimes, Gary L., "Applications of Parallel Optical Interconnects," Lasers and Electro-Optics Society Annual Meeting, Nov. 18-21, 1996, pp. 6-7, vol. 2.

Shahid, et al., "Flexible High Density Optical Circuits," National Fiber Optic Engineers Conference, 2001 Technical Proceedings.

* cited by examiner

BEND-LIMITED FLEXIBLE OPTICAL INTERCONNECT DEVICE FOR SIGNAL DISTRIBUTION

CROSS REFERENCE TO RELATED APPLICATION

This is a continuation of U.S. application Ser. No. 13/230,117, filed Sep. 12, 2011, now U.S. Pat. No. 9,229,172, the disclosure of which is incorporated herein by reference in its entirety.

FIELD OF THE INVENTION

The invention pertains to fiber optic connectivity for high speed signal distribution. More particularly, the invention pertains to methods and apparatus for bend limiting a flexible optical interconnect device.

BACKGROUND OF THE INVENTION

Fiber optic breakout cassettes are merely one form of passive optical interconnect devices commonly used for distributing signals between one or more transmit optical components and one or more receive optical components (often in opposite directions simultaneously).

Other common passive optical interconnect devices are optical multiplexers and demultiplexers, which comprise a flexible optical circuit, for distributing signals between one or more single- or multi-fiber optical connectors on the one hand and one or more single- or multi-fiber optical connectors on the other hand. Other common forms of optical interconnect include simple patch cables and optical splitters.

Flexible optical circuits are passive optical components that comprise one or more (typically multiple) optical fibers imbedded on a flexible substrate, such as a Mylar® or other flexible polymer substrate. Commonly, although not necessarily, one end face of each fiber is disposed adjacent one longitudinal end of the flexible optical circuit substrate and the other end face of each fiber is disposed adjacent the opposite longitudinal end of the flexible optical circuit substrate. The fibers extend past the longitudinal ends of the flexible optical circuit (commonly referred to as pigtails) so that they can be terminated to optical connectors, which can be coupled to fiber optic cables or other fiber optic components through mating optical connectors.

Flexible optical circuits are known, and hence, will not be described in detail. However, they essentially comprise one or more fibers sandwiched between two flexible sheets of material, such as Mylar® or another polymer. An epoxy may be included between the two sheets in order to make them adhere to each other. Alternately, depending on the sheet material and other factors, the two sheets may be heated above their melting point to heat weld them together with the fibers embedded between the two sheets.

Figure 1:
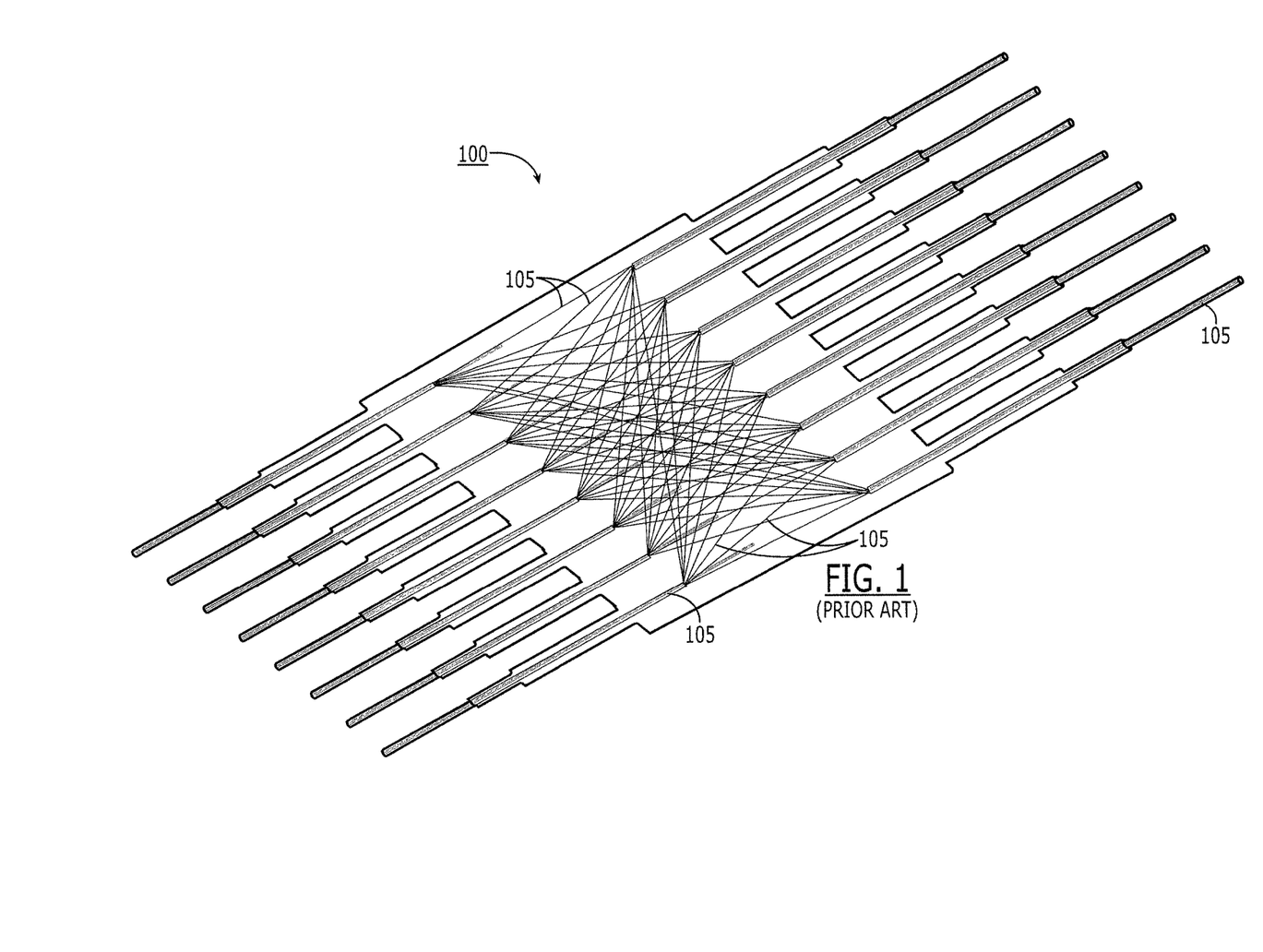
FIG. 1 is a perspective view of a flexible optical circuit of the prior art.
Figure 2:
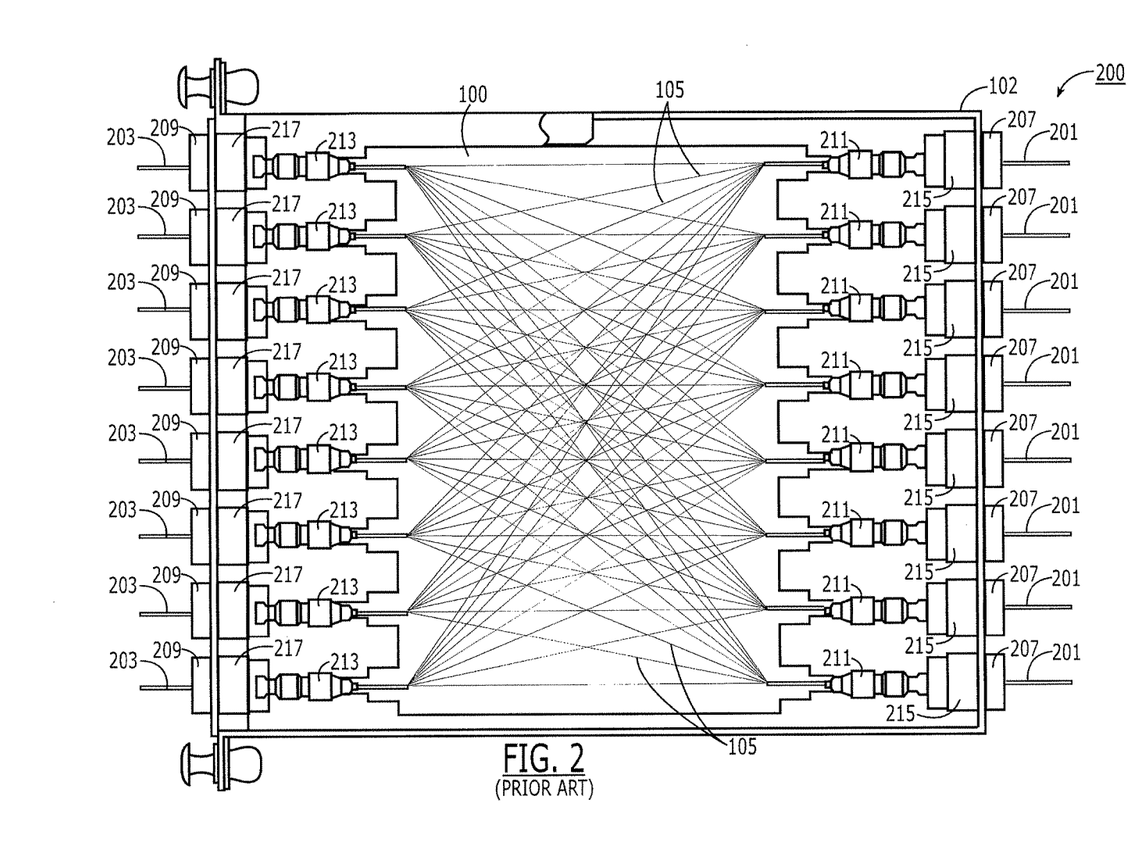
FIG. 2 shows an optical multiplexer/de multiplexer incorporating the flexible optical circuit of FIG. 1.

FIG. 1, for example, shows a flexible optical circuit 100 that might be used in an optical multiplexer/demultiplexer. This flexible optical circuit 100 commonly is referred to as a shuffle. FIG. 2 shows a complete optical multiplexer/demultiplexer 200 including the shuffle 100 and a housing 102. The top of the housing is removed in FIG. 2 to allow viewing of the internal components of the device 200. This particular optical multiplexer/demultiplexer 200 is intended to distribute signals between a set of eight multi-fiber optical cables 201 on the right side of the figure, each containing eight fibers (not shown), and another set of eight optical cables 203 on the left side of the figure, each cable containing eight fibers (not shown). More particularly, the cables 201 and 203 terminate to suitable optical connectors 207 and 209, respectively, which engage with mating connectors 211, 213, respectively, through adapters 215, 217 disposed in the housing 102. For each of the eight right-hand cables 201, the fibers 105 embedded in the shuffle 100 break out the eight signal paths and distribute one each to each of the eight left-hand cables 203, and vice versa.

Flexible optical circuits such as shuffle 100 of FIGS. 1 and 2 can be bent too sharply. Particularly, there are three concerns with respect to bending flexible optical circuits too sharply. First, the optical fibers 105 embedded within them can break if bent too sharply. Secondly, even if the fibers do not break, too sharp of a bend in a fiber can cause light to escape from the core of the fiber, thus leading to signal loss. Finally, the flexible optical circuit substrate usually is a laminate, and bending a laminate too sharply can cause it to de-laminate.

SUMMARY OF THE INVENTION

The invention relates to a bend limiting structure for preventing a flexible optical circuit from being bent too sharply. More particularly, the invention involves adding a bend limiting layer or layers to the flexible optical circuit and/or any housing or other structure within which it is enclosed or to which it is attached. The bend-limiting layer may comprise a plurality of blocks arranged in a line or plane and joined by a flexible film that is thinner than the blocks, with the blocks positioned close enough to each other so that, if that plane of blocks is bent a predetermined amount, the edges of the blocks will interfere with each other and prevent the plane from being bent any further. The blocks may be resilient also to provide a less abrupt bend-limiting stop.

DETAILED DESCRIPTION

U.S. Patent Publication No. 2013/0064506, filed Sep. 12, 2011, which is incorporated herein fully by reference, discloses a lensed flexible optical circuit bearing at least one, but, more effectively, many optical fibers embedded in a flexible optical circuit substrate with molded lenses (or other light-guiding, fiber termination elements such as mirrors, gratings, etc.) disposed at the ends of the fibers. The lensed flexible optical circuit can be incorporated into a housing to form any number of optical interconnect devices, such as optical cassettes, optical multiplexers/demultiplexers, optical breakouts, and optical monitoring stations. The lenses can be optically interfaced to optical connectors (e.g., MPO, LC, ST, SC plugs) at the ends of cables or at the interfaces of electro-optical devices without the need for a full mating connector (e.g., MPO, LC, ST, SC receptacles). Rather, a connector on an optical component, e.g., an LC plug at the end of a fiber optic cable, can be plugged into an adapter on a panel of the housing to optically couple to one of the optical fibers on the flexible optical circuit inside of the cassette enclosure via one of the lenses. The elimination of conventional mating connectors inside the cassette significantly reduces overall cost because it eliminates the skilled labor normally associated with terminating an optical fiber to a connector, including polishing the end face of the fiber and epoxying the fiber into the connector. It further allows the optical interconnect device (e.g., an optical cassette) to be made very thin. The housing for the lensed flexible optical circuit also may be flexible. In yet other embodiments, there may be no housing at all.

Since the lensed flexible optical circuit is mechanically flexible, the concept of the present invention can be used in many different applications, of which optical cassettes is merely one example. For instance, it can be used to make right angle connections. It may be curled into a cylinder and used to make optical interconnections in existing conduit. The lensed flexible optical circuit connectivity concept can be incorporated into flexible housings, such as housings made of rubber so that a single cassette can be used to make connections in different environments and/or can compensate for offsets in all six degrees of freedom (e.g., X, Y, Z, roll, pitch, and yaw).

The invention further can be incorporated into housings having parts interconnected by one or more hinges so that the housings are bendable about the hinges to provide similar flexibility.

Figure 3:
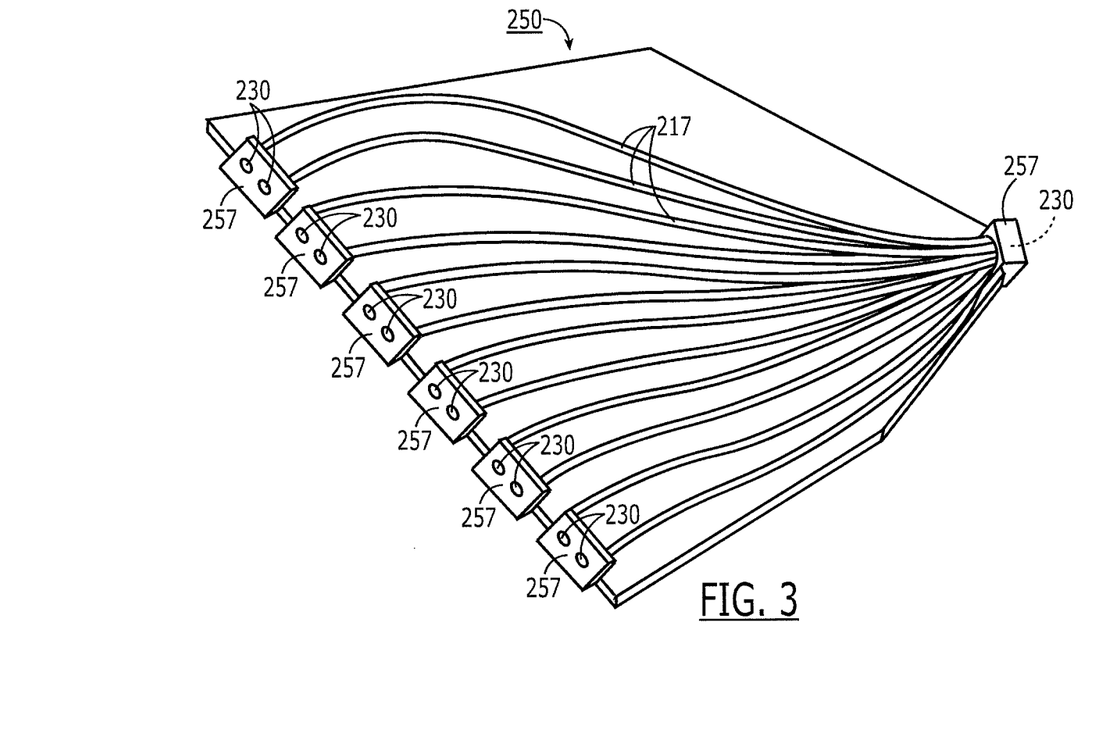
FIG. 3 is a top perspective view of a lensed flexible optical circuit in accordance with the principles of the present invention.

FIG. 3 show a top perspective view of such a lensed flexible optical circuit 250 configured as an optical breakout circuit incorporating the principles of the present invention. Particularly, an optical fiber cable (not shown) on the right hand side containing twelve fibers (e.g., six transmit fibers and six receive fibers) is routed in pairs (one receive and one transmit) to six, dual-fiber optical cables (not shown) on the left hand side. Thus, the flexible optical circuit 250 includes twelve optical fibers 217 routed accordingly. All of the embedded fibers 217 are terminated at each end to lens blocks 257 containing molded lenses 230.

Considerable technology has been developed relating to the design, fabrication, and use of such lenses in optical connectors, which technology can be used to design and fabricate such lenses 230, terminate the optical fibers 217 with such lenses, and couple light through such lenses to fibers in optical connectors. Such information can be obtained from the following patents and patent applications, all of which are incorporated herein fully by reference:

U.S. Pat. No. 7,722,261 entitled Expanded Beam Connector;
U.S. Pat. No. 8,085,472 entitled Expanded Beam Interface Device and Method of Fabricating Same;
U.S. Pat. No. 8,313,249 entitled Multi-Fiber Ferrules for Making Physical Contact and Method of Determining Same;
U.S. Pat. No. 6,012,852 entitled Expanded Beam Fiber Optic Connector;
U.S. Pat. No. 6,208,779 entitled Optical Fiber Array Interconnection;
U.S. Pat. No. 6,480,661 entitled Optical ADD/DROP Filter and Method of Making Same;
U.S. Pat. No. 6,690,862 entitled Optical Fiber Circuit;
U.S. Pat. No. 6,012,852 entitled Expanded Beam Fiber Optic Connector; and
U.S. Patent Publication No. 2012/0014645, filed Jul. 14, 2010, entitled Single-Lens, Multi-Fiber Optical Connector Method and Apparatus.

More specifically, technology is available to couple a connector directly in front of the lens 230 so that the lens does not need to have its own conventional mating connector, such as disclosed in aforementioned U.S. Pat. No. 7,722,261.

Figure 4:
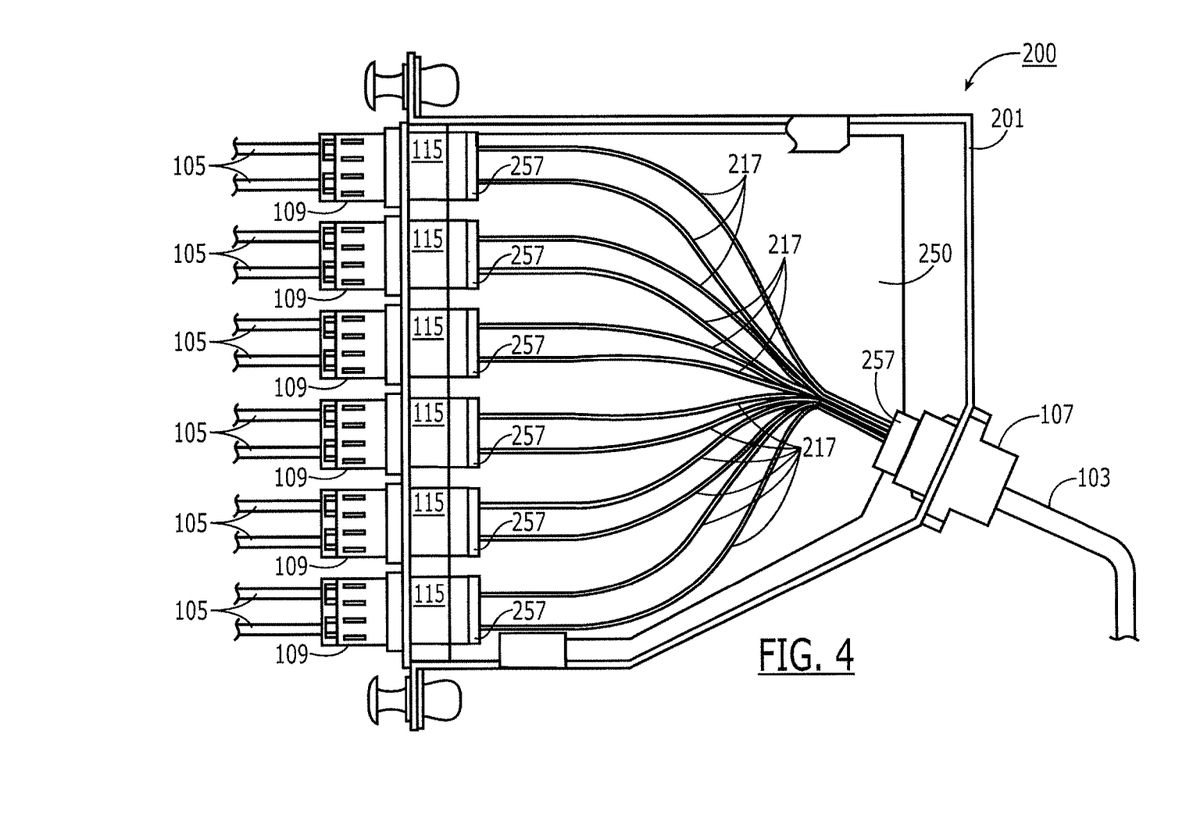
FIG. 4 shows an optical cassette in accordance with the principles of the present invention comprising a housing and incorporating the flexible optical circuit of FIG. 3.

As shown in FIG. 4, such a lensed flexible optical circuit 250 may be disposed within a housing or other structure with adaptors or other structure for receiving external connectors at the ends of cables 105 or on other optical components so as to optically couple with the lenses 230 without the need for a conventional mating optical connector. For instance, FIG. 4 shows the lensed flexible optical circuit 250 of FIG. 3 incorporated into an optical cassette 200. Cables 103, 105 (or any other optical components that are to be optically interconnected through the lensed flexible optical circuit 250) may be terminated with conventional connectors 107, 109. These connectors 107, 109 may be plugged into adapters 115 on the cassette 200 adjacent the respective lenses 230 and optically couple with the lenses 230 (and, through the lenses, with the fibers 217 of the flexible optical circuit 250) without the need for a conventional, complementary mating receptacle connector on the inside of the cassette housing 201.

Figure 5:
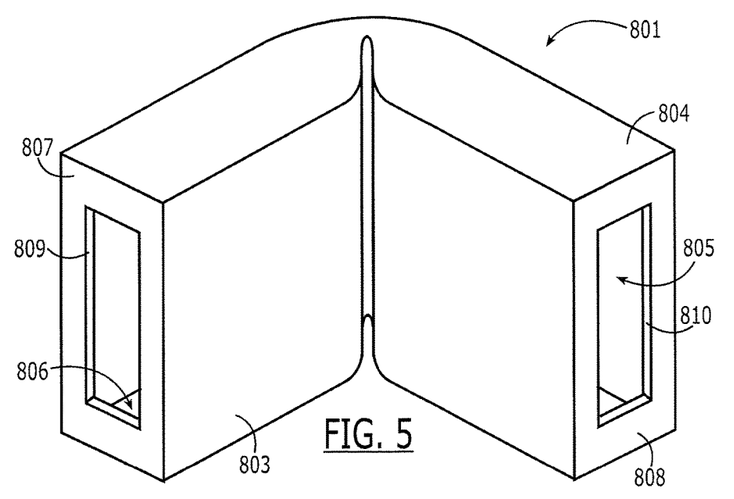
FIG. 5 shows another optical cassette housing for housing a flexible optical circuit in accordance with the principles of the present invention.

In yet other embodiments, such as illustrated in FIG. 5 (only the housing is shown), the entire housing 801 or at least the side walls 803, 804, 805, 806 (i.e., the walls interconnecting the panels 807 and 808 that bear the apertures 809, 810 that receive the external connectors) may be made of a flexible material such as rubber so that the housing 801 can be bent to accommodate situations in which the optical components to be interconnected by the device cannot be longitudinally aligned.

Figure 6:
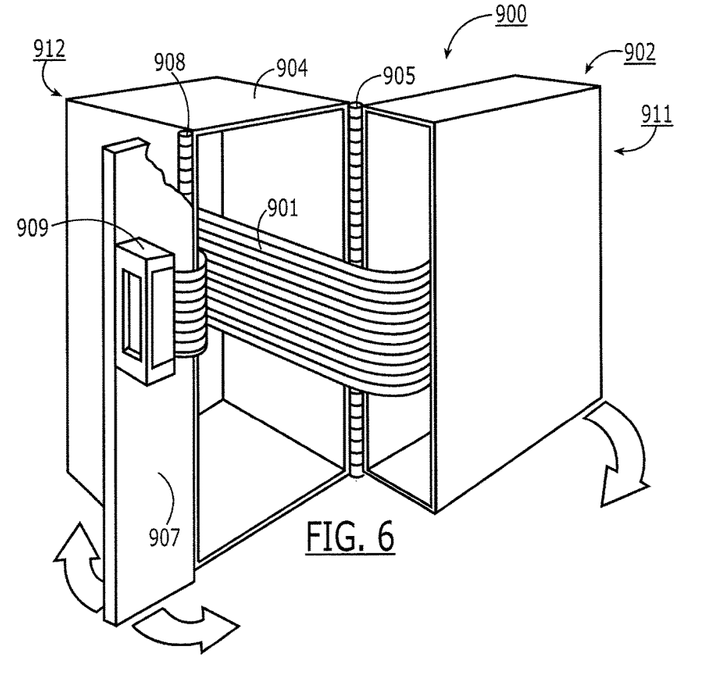
FIG. 6 shows yet another optical cassette housing for housing a flexible optical circuit in accordance with the principles of the present invention.

FIG. 6 illustrates yet a further embodiment in which the lensed flexible optical circuit 901 includes a housing 900 that comprises hinged members 902, 904. Specifically, the housing comprises two housing pieces 902, 904 joined at a hinge 905 so that the two housing pieces 902, 904 may be disposed relative to each other at different angular orientations about the hinge 905. The two lens blocks may be disposed on the opposing end faces 911, 912 of the housing 902. However, the illustrated embodiment shows a more adaptable configuration that further includes an additional panel 907 connected to housing piece 904 via a second hinge 908. The lens block 909 is mounted on the panel 907, which can be pivoted about hinge 908 to provide additional freedom in positioning the ends of the flexible optical circuit relative to each other.

Situations in which lensed flexible optical circuits are useful are bountiful. For instance, because there are no internal connectors (in lensed embodiments), the flexible optical circuit interconnector can be made very thin. Particularly, it may comprise a housing that, other than the end faces that receive the external connectors, merely need be thick enough to house the flexible optical circuit (and accommodate any necessary curvature thereof, such as corrugations or an S curve as mentioned previously). In fact, also as previously noted, in some embodiments, there may be no housing at all and adapters or other structure for receiving the external connectors may be incorporated directly on the flexible optical circuit adjacent the end faces of the fibers and the lenses. Accordingly, it can be used for very low profile surface-mounted boxes, such as for use in low profile wall-mounted interconnects for office buildings, etc. It also may be used for interconnects in modular furniture pieces, which often provide very small spaces for electrical or optical equipment.

Yet further, it is envisioned that a wide variety of optical interconnects can be made modularly from a relatively small number of modularly connectable housing components, flexible optical circuits, lens blocks, and adapters. Particularly, there would need to be a flexible optical circuit for each different optical routing pattern type, e.g., 1 to 12 cable breakout (such as illustrated in FIG. 3), shuffle (such as illustrated in FIG. 1), 1 to 4 breakout, 1 to 4 optical splitter, etc. However, note that a single lensed flexible optical circuit may be used for various different numbers of breakouts, splits, shuffles, etc. For instance, a lensed flexible optical circuit in accordance with the present invention bearing fiber routing for ten 1 to 4 breakouts may be used to create an optical cassette to provide anywhere from a single 1 to 4 breakout to as many as ten 1 to 4 breakouts. If the situation calls for less than ten such breakouts, then some of the fibers/lenses simply would not be used.

While the optical interconnects have been described herein in connection with embodiments employing molded lenses, it will be understood that this is merely exemplary and that other optical components may be embedded in the laminate at the ends of the fibers, such as diffraction gratings, Escalier gratings, mirrors, and holograms.

Since the lensed flexible optical circuits are flexible, they can be bent to accommodate many different physical layouts. Furthermore, the lensed flexible optical circuits may be constructed of sufficient length to accommodate longer applications, but may be folded for shorter applications. In cassette type or other application involving a housing, a set of multiple housing pieces adapted to be modularly joined to each other in various combinations may be provided. The housing components may provide for hinged and/or fixed joining. One or more of the housing components may be flexible. Thus, it is possible to modularly create a wide variety of housing shapes, place one of the flexible optical circuits within it, and place lens blocks in suitable adapters disposed in windows in the housings.

Figure 7:
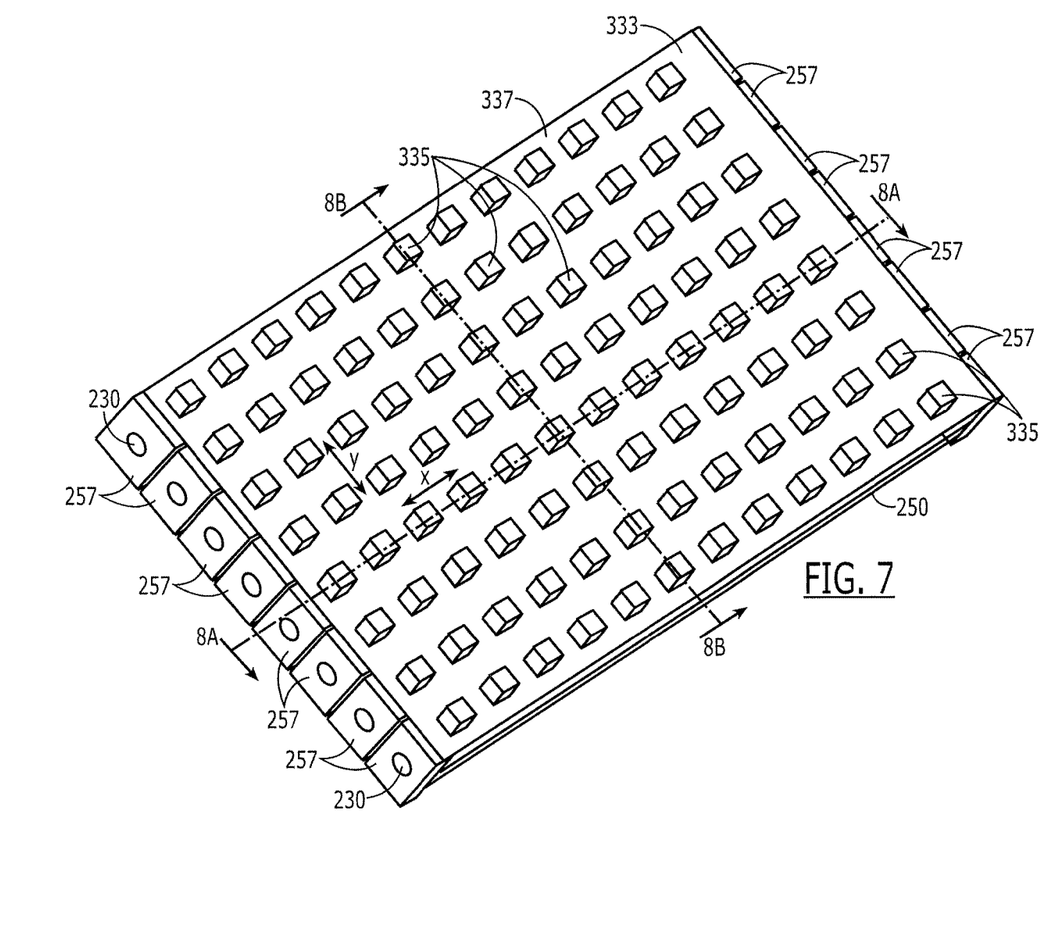
FIG. 7 is a bottom perspective view of a lensed flexible optical circuit that can replace the flexible optical circuit and internal connectors of FIG. 3.
Figure 8A:
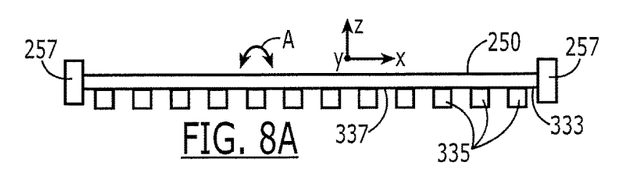
FIG. 8A is a sectional side view of the lensed flexible optical circuit of FIG. 3 through section 8A shown in FIG. 7.
Figure 8B:
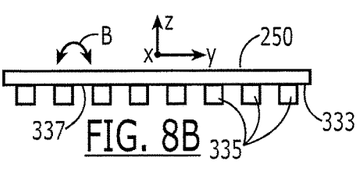
FIG. 8B is a sectional side view of the lensed flexible optical circuit of FIG. 3 through section 8B shown in FIG. 7.

Since the lensed (FIG. 3) and unlensed (FIGS. 1 and 2) flexible optical circuits discussed hereinabove contain optical fibers, they can be bent too sharply so as to cause breakage of the fibers or at least signal loss. Delamination of the flexible optical circuit also is possible if bent too sharply. In order to limit bending of the flexible optical circuits, a bend limiting layer may be added to the laminate. FIG. 7 is a bottom perspective view of a lensed flexible optical circuit 250 adapted to perform the same functions as the 8-to-8 shuffle of FIGS. 1 and 2, except employing a lensed flexible optical circuit such as in FIG. 3, rather than an unlensed flexible optical circuit and conventional internal connectors as in FIGS. 1 and 2. FIGS. 8A and 8B are cross-sectional views through 5 sections 8A-8A and 8B-8B, respectively, in FIG. 7. In the illustrated embodiment, the bend limiting layer 333 comprises a plurality of blocks 335 coupled to each other via a flexible film 337. The blocks 335 are spaced from each other and sized so that the layer 333 may freely bend to the point at which the blocks 335 contact each other at their corners in order to prevent further bending of the film, as illustrated in region 340 in FIG. 9. More specifically, adjacent pairs of blocks contact each other at their corners when a predetermined bend radius is reached, thereby resisting further bending of the bend limiting layer and, thereby, the flexible optical substrate to which it is laminated. The bend limiting layer should be attached to one of the major surfaces of the flexible optical circuit so as to bend with and substantially identically to the flexible optical circuit substrate, which can be achieved, for instance, by adhering or otherwise attaching it to the flexible optical circuit substrate substantially over the bend limiting layer's entire extent.

Figure 9:
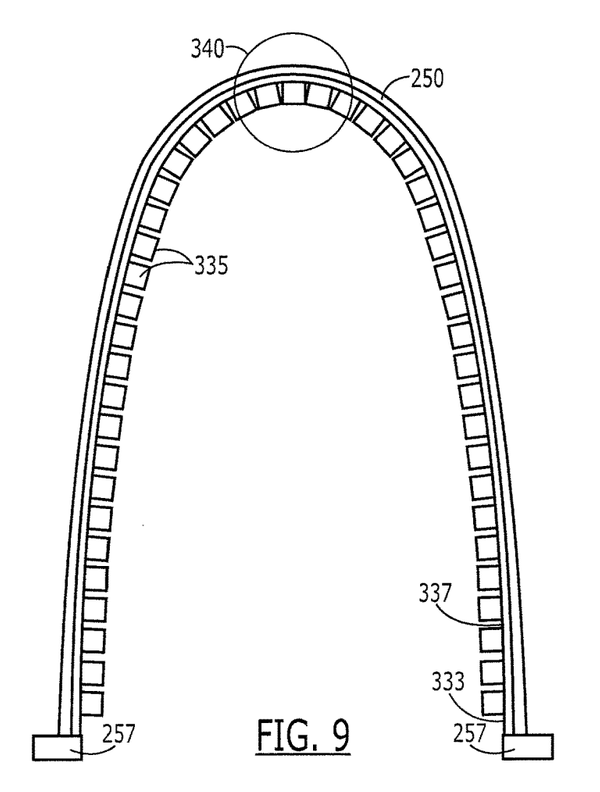
FIG. 9 is a side view of the lensed flexible optical circuit of FIGS. 3-5 bent to its limit in one dimension.

The spacing and size of the blocks should be selected so as to prevent further flexing of the flexible optical circuit 250 when the bend radius of the film is slightly less than the maximum desired bend radius to prevent delamination, fiber breakage, and/or signal loss within the fibers. The blocks may be hard or may have some resilience in order to provide a soft bend limiting stop.

By providing a single, two-dimensional planar array of blocks (e.g., rows and columns), bending is limited in two directions, namely, the directions illustrated by arrow pairs A and B in FIGS. 8A and 8B. More specifically, the spacing of the blocks in direction X combined with the height of the blocks in dimension Z collectively define the bend limit in direction A, and the spacing of the blocks in dimension Y combined with the height of the blocks in the Z dimension collectively define the bend limit in direction B. The blocks theoretically also can be used to limit bending within the plane of the flexible optical circuit, but flexible optical circuits generally are not sufficiently flexible in that dimension to be of any concern.

If bend limiting is desired in only one direction, then the plurality of blocks may comprise a single line of blocks (e.g., a single row or column).

Figure 10:
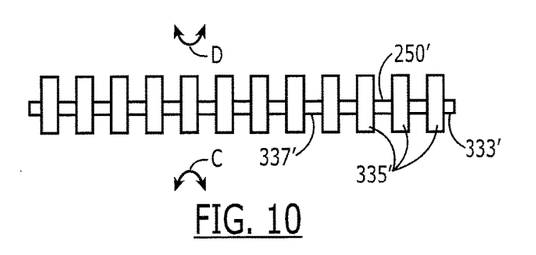
FIG. 10 is a cross-sectional side view of a bend limiting layer in accordance with an alternate embodiment of the invention.

In the bend limiting layer 333 illustrated in FIGS. 7, 8A, and 8B, the blocks 335 extend from the film 337 in only one direction (downwardly from the film 337 in the dimension). However, FIG. 10 shows an alternate embodiment of a bend limiting layer that limits bending in both opposing directions about the bend axis. Specifically, FIG. 10 is a cross-sectional side view through an alternate embodiment of a bend limiting layer 333' in which the blocks 335' extend from the film 337' in both directions of the Z dimension, i.e., both above and below the plane defined by the film 337'. This bend limiting layer 333' limits bending in both directions about the bend axis (see arrow pairs C and D). If desired for any reason, the bend limit in the two directions of each arrow pair can be made different by making the blocks asymmetric about the plane defined by the film 337 (i.e., having a different height above the plane of the film 337 than below the film). In fact, since the bend limiting layer 333 is placed on one side of the flexible optical circuit 250, the blocks 335 actually would need to be slightly different heights above and below the film 337 in order to provide identical bend limits in both arrow pair directions because the film would stretch when bent in one direction and compress in the other direction. In other embodiments, instead of a single block extending through the film in both directions, different blocks may be disposed on one side of the film than on the other side.

Yet further, the blocks 335 can be disposed on one side of the film 337 so as to limit bending only in one direction of the arrow pair A and/or arrow pair B. In some embodiments, a first bend limiting layer may be disposed on one side of the flexible optical circuit and a second bend limiting layer may be disposed on the other side of the flexible optical circuit substrate in order to collectively provide bend limiting in both directions of the arrow pair(s).

The blocks need not be uniformly spaced. For example, if for any reason it is desired to allow a first portion of the flexible optical circuit to bend more than a second portion, the blocks may be spaced further apart (and/or made shorter) in the first portion of the bend limiting layer than in the second portion. Furthermore, the bend limit in the two orthogonal directions represented by arrow pair A on the one hand and arrow pair B on the other hand need not necessarily be equal. For example, the blocks may be spaced at longer intervals in dimension Y than in dimension X so as to allow greater bending (i.e., bending to a smaller radius) in the direction of arrow pair B than in the direction of arrow pair A. The particular routing of the fibers on the flexible optical circuit very well may dictate the ability to allow much greater bending in one direction or one portion of the flexible optical circuit than in another. For instance, the flexible optical circuit of FIGS. 3-5, in which the fibers run substantially in the X dimension, can be allowed to bend to a much smaller radius in the direction of arrow pair B (i.e., bending about an axis substantially parallel to the fibers) than in the direction of arrow pair A (i.e., bending about an axis substantially perpendicular to the fibers). This feature could be very important in flexible optical circuits that need to be rolled into a cylinder, such as to fit within existing conduit.

Yet further, while the blocks 335 are substantially cubic in the illustrated embodiments, this is merely exemplary. The blocks may be of essentially any shape, such as cubes, cylinders, semi-cylinders, spheres, hemispheres, rectangular prisms, triangular prisms, truncated cones (frustums), truncated pyramids, etc. In fact, the shape, and not merely the size, of the blocks may be used to dictate the bend limit in different directions. In addition, the shapes of the blocks may be different in different portions of the flexible optical circuit substrate so as to provide different bend limits in different portions of the flexible optical circuit substrate.

The film layer 337 preferably is formed of a flexible and resilient film, such as another layer of Mylar® (a trademark of E.I. DuPont De Nemours and Company) or another flexible and resilient polymer. The film preferably is resilient because it may need to stretch and compress so as not to de laminate from the flexible optical circuit during bending and/or so as not to unnecessarily resist bending in the direction opposite of the side of the flexible optical circuit on which it is disposed.

The blocks 335 may be either embedded in the film 337, as illustrated, or adhered to one side of the film. In other embodiments, the bend limiting layer 333 may be of unitary construction, such as a molded piece made of a single material such as Mylar® with the block portions 335 simply being molded thicker than the intermediate film portions 337. Alternately, the blocks may be formed of any reasonable hard or semi-hard material, such as polyethylene, hard rubber, metal, etc.

In yet other embodiments, the blocks 335 need not be attached to a separate film such as film 337, but instead may be adhered to or otherwise disposed directly on one or both of the opposing major surfaces 338, 339 of the flexible optical circuit 250 itself.

Figure 11:
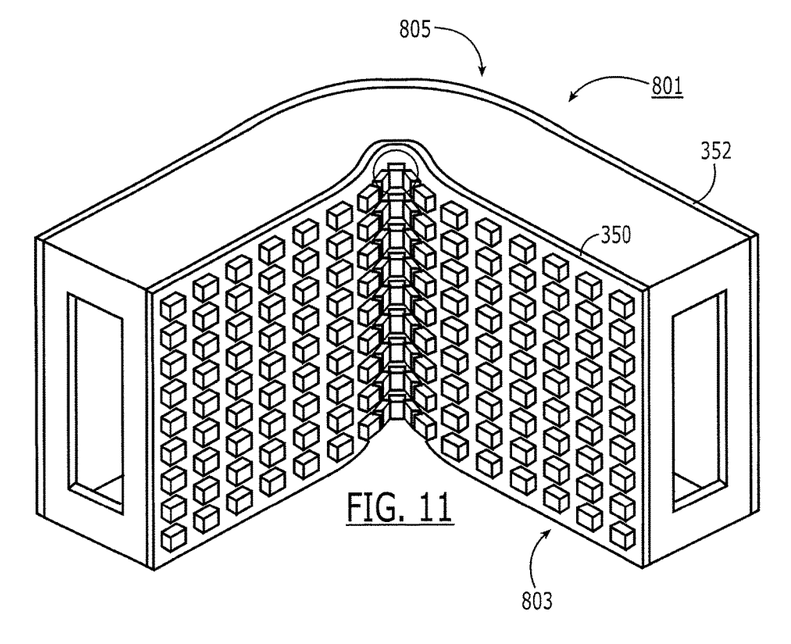
FIG. 11 shows the housing of FIG. 7 including a pair of bend limiting layers in accordance with the principles of the present invention.

In embodiments in which the flexible optical circuit 250 is disposed within a bendable housing such that the flexible optical circuit only bends essentially as dictated by the bending of the housing, such as in the embodiments illustrated in FIGS. 7 and 8, then the bend limiting layer(s) may be applied to the housing instead of the flexible optical circuit. FIG. 11 illustrated such an embodiment. In this embodiment, two bend limiting layers 350, 352 are disposed on opposite sides 803, 805 of the flexible housing 801 of FIG. 9.

Having thus described particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

What is claimed is:

1. A device for interconnecting optical signals comprising:
   a flexible optical circuit substrate;
   a plurality of optical fibers disposed on the substrate, each of the optical fibers having a first end and a second end;
   a bend limiting layer attached on the device so as to bend with and substantially identically to the flexible optical circuit substrate, the bend limiting layer configured to resist bending of the flexible optical circuit substrate past a predetermined amount;
   wherein the device further includes:
   at least a first light-guiding, fiber termination optical element provided in the form of a multi-fiber optical connector disposed on the substrate adjacent the first ends of the optical fibers positioned to couple light with the optical fibers;
   at least a second light-guiding, fiber termination optical element disposed on the substrate adjacent the second ends of the optical fibers positioned to couple light with the optical fibers, the second light-guiding, fiber termination optical element having a different configuration than the first light-guiding, fiber termination optical element, wherein the second light-guiding, fiber termination optical element is not any of an SC connector, an LC connector, an ST connector, or an MPO connector; and
   a plurality of optical adapters configured to mate the second light-guiding, fiber termination optical elements with third light-guiding, fiber termination optical elements provided in the form of single-fiber optical connectors each provided in the form of an LC connector, wherein each of the third light-guiding, fiber termination optical elements has a different configuration than the second light-guiding, fiber termination optical element and also has a different configuration than the first light-guiding, fiber termination optical element provided in the form of a multi-fiber optical connector.

2. The device of claim 1, wherein the bend limiting layer is directly attached to the flexible optical circuit substrate.

3. The device of claim 1 further comprising a housing within which the flexible optical circuit substrate is disposed, wherein the bend limiting layer is attached to the housing.

4. The device of claim 1, wherein the second light-guiding, fiber termination optical elements are lenses.

5. The device of claim 1, wherein the flexible optical circuit substrate comprises a laminate having first and second layers, and wherein the plurality of optical fibers are embedded between the first and second layers.

6. The device of claim 1, wherein the bend limiting layer comprises a first bend limiting layer disposed on a first major surface of the flexible optical circuit substrate and a second bend limiting layer disposed on a second major surface of the flexible optical circuit substrate.

7. The device of claim 3 wherein the housing is flexible.

8. The device of claim 3 wherein the housing comprises first and second housing parts hingedly connected to each other.

9. The device of claim 1, wherein the bend limiting layer comprises a plurality of blocks disposed relative to each other such that adjacent pairs of the blocks contact each other when the bend limiting layer is bent the predetermined amount.

10. The device of claim 9, wherein the bend limiting layer further comprises a film interconnecting the blocks.

11. The device of claim 10, wherein the film is resiliently stretchable.

12. The device of claim 10, wherein the blocks and the film of the bend limiting layer are unitary.

13. The device of claim 10, wherein the blocks extend in only one direction perpendicularly from a plane defined by the film.

14. The device of claim 9, wherein the blocks are arranged in a two dimensional planar array.

15. The device of claim 14 wherein the blocks are arranged in rows and columns.

16. The device of claim 14 wherein the bend limiting layer provides different bend limits in different orthogonal directions.

* * * * *